United States Patent [19]

Felter et al.

[11] Patent Number: 4,976,890
[45] Date of Patent: Dec. 11, 1990

[54] STATIC DISSIPATIVE VINYL SHEET AND FILM

[75] Inventors: Richard E. Felter, Lancaster; Dean A. Markley, Mountville; Deborah L. Musser, Lancaster, all of Pa.

[73] Assignee: Armstrong World Industries, Inc., Lancaster, Pa.

[21] Appl. No.: 201,854

[22] Filed: Jun. 3, 1988

[51] Int. Cl.$^5$ .............................................. H01B 1/06
[52] U.S. Cl. ................................... 252/511; 252/506; 252/507; 252/518; 252/520; 524/413
[58] Field of Search ............... 252/511, 512, 518, 520, 252/506, 507; 524/439, 495, 496, 401, 409

[56] References Cited

U.S. PATENT DOCUMENTS 4,228,650 10/1980 Martin et al. ..................... 252/511
4,374,760 2/1983 Charles ............................. 252/511

Primary Examiner—Josephine Barr

[57] ABSTRACT

Particulate vinyl resin mixed with a liquid premix of carbon black, plasticizer, etc. provides surface resistivities of $10^4$–$10^9$ ohm/sq. with as little as 0.2 to 5% by weight carbon black in fused sheets or films useful for conductive flooring or wrapping. Overcoating with a plastisol before fusion provides a smooth surface without loss of static dissipative properties. Conductive $TiO_2$, $Sb/SnO_2$, organic titanates, dispersions of carbon black and titanium dioxide, di-2-ethylhexyl phthalate, epoxidized soybean oil, polyethylene glycol and organic stabilizer are useful for preparing PVC resin compositions.

12 Claims, No Drawings

STATIC DISSIPATIVE VINYL SHEET AND FILM

FIELD OF THE INVENTION

The invention relates to electrically conductive plastic sheets or films. More particularly, the invention relates to vinyl plastic structures in the form of sheets or films which contain conductive particles and which, optionally, can be overcoated with a vinyl plastisol composition.

BACKGROUND OF THE INVENTION

Carbon black and other metals, powders, fibers and ionic polymers have been incorporated in a wide variety of manufacturing formulations for antistatic protection. Carbon black which is readily available in many grades either as a powder or aqueous dispersion can be conveniently employed Whenever black coloration is not objectionable as in tires, mats, video disks, etc.

Pony et al., U.S. Pat. No. 4,097,656, discloses polymerizable plastics Which can be blended with conductive carbon black specially prepared by treatment with hydrocarbons under pressure and then heated.

Martin et al., U.S. Pat. No. 4,228,050, discloses molding video disks containing about 15% carbon black having a high surface area and a high proportion of voids in which electrical current flows in a highly efficient manner in an otherwise nonconductive polymer matrix.

Charles, U.S. Pat. No. 4,874,760, discloses improving conductivity of a resin with carbon black by adding an organic titanate coupling agent to the composition.

McCraken et al., U.S. Pat. No. 4,629,585, discloses a foamable antistatic polymer composition containing 5% conductive carbon black having a BET surface area of at least 500 m$^2$/g.

A recent article by Arie Oalahorra - *Investigation of Electrical Resistivity- Pigment Volume Concentration Relationship in Carbon Black-Filled Conductive Paint*, Journal of Coatings Technology, Volume 60, No. 757, February 1988, discusses conductivity changes in a carbon black/PVO polymer matrix with carbon black loadings of 15 to 37%. A high grade conductive carbon black (Ketjenblack EL-DJ6o0 from AKZO Chemie, the Netherlands) was reported to be the best conductive filler employed in these tests.

White and transparent conductive powders for use as antistatic additions in PVO and polypropylene are described in an article by Yoshizume and Wakabayashi of Mitsubishi Metal Corporation, *Conductive Powders Adapt to Today's Product Decors*, Plastics Engineering, March 1987, pp. 61–64. Based on data provided in this article, about 57% by weight titanium dioxide coated with antimoney doped tin oxide will provide 10$^9$ ohm/sq. surface resistivity for a plastic film.

Thus, while a large number of publications existed prior to the present invention on various ways to employ conductive particles such as carbon black in vinyl plastics such as PVO, the prior publications failed to describe means or measures to incorporate carbon black without rendering the composition black or how to employ low amounts of carbon black. e.g.. using less than 4 to 5% by weight of carbon black in a vinyl plastic matrix.

In contrast to the practice and experience heretofore, the present invention utilizes considerably lower amounts of carbon black and enables dilution of the carbon black pigment with nonconductive white pigment while providing fully adequate static dissipative vinyl sheets and films.

SUMMARY OF THE INVENTION

The present invention provides a novel static dissipative composition comprising: (a) vinyl resin, (b) plasticizer, (c) stabilizer and (d) conductive particles as 0.2 to 20% by weight of the total weight of the composition, wherein the fused composition provides a surface resistivity below 10$^{10}$ ohm/sq. Without further additions or processing, a sheet or film of the composition provides utility for an antistatic mat which can be either foamed or unfoamed.

A preferred composition comprises: (a) polyvinyl chloride porous resin, (b) di-2-ethylhexyl phthalate and butyl benzyl phthalate, (c) organotin stabilizer, (d) 0.35 to 4.5% by weight of carbon black, (e) isopropyl triisostearyl titanate, (f) titanium dioxide and (g) polyurethane glycol and epoxidized soybean oil. The preferred composition of components (a) to (f) may be blended, sintered and further overcoated with a white printing ink plastisol comprising (g) vinyl resin, (h) isobutyrate, (i) di-2-ethylhexyl phthalate, (j) epoxidized soybean oil, (k) organotin stabilizer and (l) titanium dioxide, followed by fusing at about 425° F. for three minutes. The resulting fused composition has a smoothed surface and can be produced in shades of grey or with a salt and pepper appearance.

A method for producing static dissipative vinyl sheet or film comprises the steps:

(1) mixing a vinyl resin and a liquid premix comprising conductive particles, plasticizer and stabilizer to form a dry blend;
(2) cooling the dry blend,
(3) applying the dry blend on a vinyl substrate, and
(4) heating the dry blend to fuse it on the substrate, thereby producing a static dissipative vinyl sheet or film.

A preferred method for producing static dissipative vinyl sheet or film is that wherein the aforesaid liquid pre-mix comprises dispersed carbon black, dispersed titanium dioxide, di-2-ethyl hexyl phthalate, butyl benzyl phthalate, epoxidized soybean oil, polyethylene glycol and organotin stabilizer.

In another preferred embodiment, the above method includes applying a plastisol comprising vinyl resin, isobutyrate, di-2-ethylhexyl phthalate, epoxidized soybean oil, organotin stabilizer and titanium dioxide to a sintered layer of the above dry blend followed by fusing the resulting coated vinyl substrate at about 425° F. for three minutes.

DETAILED DESCRIPTION OF THE INVENTION

A need exists for flooring, table tops, surfaces, containers, etc. which are suitable for use in an environment where electrostatic discharge must be controlled. Where sensitive electronic components are manufactured, designed, tested and used, stray electrostatic charge must be dissipated effectively to avoid damage or inconsistent results. It is convenient when the materials manufactured for these purposes are constituted of a conductive composition. Further, it is advantageous if these antistatic materials can be manufactured in other than basic black color tones.

Conductive carbon blacks and other particles suitable for use in the present invention are commercially available as both powder and dispersion forms in Various grades and prices from a number of sources. These include: grades of Ketjenblack ® from Noury Chemicals of Akzo Chemical America, grades of Conductex ® from Columbian Chemicals Company, and Vulcan XC-72 ® from Cabot Corporation. White and transparent conductive particles are available from Mitsubishi Metal Oorporation, Saitama, Japan or its U.S. supplier, C. Withington Co. These are $TiO_2$ coated with antimony doped tin oxide and particles of $Sb/SnO_2$. Metals in powder form can also be used.

While it was previously known to use these carbon blacks and even to specially treat them, it has now been discovered that by practicing the present invention, it is possible to use extremely low loadings of carbon black and still achieve antistatic protection. Similar reductions in loadings are also possible with other conductive particles.

The present invention is applicable to a plasticized vinyl polymer system of which plasticized polyvinyl chloride (PVC) is a preferred component. However, the invention is not limited since other thermoplastic polymer systems such as described in U.S. Pat. Nos. 4,097,656; 4,228,050; 4,374,760; and 4,629,585 can employ the practice of the present invention.

PVC resins are commercially available from many commercial sources. The preferred porous resins recommended for rapid absorption are available from Escambia Chemical Corporation and Air Products Plastics Division as PVC pearls.

In essence, the practice of the invention includes surface treatment of polymer particles with much smaller conductive particles to produce a conductive matrix. It was indeed a surprising result to discover that this conductive matrix required considerable less carbon black than employed heretofore and that electrical conductivity was not significantly decreased as various compositions were sintered or fused and/or overcoated with a non-conducting layer. Further, it was equally surprising to find that dilution with nonconductive white polymer particles pigmented with titanium dioxide did not significantly diminish conductivity while the appearance of the composition was esthetically improved.

According to the present invention, surface materials have been produced with $10^1$ to $10^9$ ohm/sq. surface resistivities. Materials ranging from $10^0$ to $10^8$ can be produced by this novel process by using up to 4% conductive particles. Because much less conductive carbon black is required, the mechanical properties of the surface materials are not significantly sacrificed. Not only did the use of a titanate coupling agent lower the amount of carbon black required, but the addition of carbon black to polymer was a smoother and cleaner process. It was further found that the process proceeds more efficiently when carbon black and/or titanium dioxide predispersed in the plasticizer were employed versus powders. This was another significant advantage of being able to reach good electrical performance with low levels of carbon. Previous requirements to incorporate 5% or more carbon black in a composition to insure adequate conductivity meant that viscosity control was a constant problem unlike the invention. In contrast to prior art workers who found it necessary to use only the most expensive grades of carbon black in order to minimize property loss, the reduced amounts of carbon black required per the present invention allow cheaper grades of carbon black to be used while avoiding changes in mechanical properties. These and other advantages will become apparent by following the practices of the present invention.

In general, the process of the invention combines a particulate polymer with conductive carbon black particles in an efficient manner to produce static dissipative sheets and films. As little as one twentieth the conventional amount of carbon black is required when a liquid premix containing the carbon black is carefully added to the particulate resin while mixing with sufficient shear to heat the mixture a limited amount. It is preferred that all liquid components be combined in a liquid premix and combined with a porous PVC resin in at least two portions while avoiding a temperature rise above about 160° F. When these precautions are taken to add liquid to solid and control mixing and temperature; a dry blend is produced in which the polymer particles become surface coated with the finely divided carbon so that the surface of the particle becomes conductive. According to the process of the present invention, it is possible to even add up to 60% white pigmented dry blend along with the carbon black dry blend and maintain conductivity while producing relatively attractive material with shades of grey or salt-and-pepper effects. Conversely, the process of the invention allows production of a black conductive film for packaging containing as little as 1.2% by weight carbon black or as thin conducting layers in composites.

Two modifications are possible:

Add $TiO_2$ with the carbon black to produce grey dry blend and grey sheet grounds.

2. Mix carbon dry blend with $TiO_2$ dry blend to produce salt-and-pepper effect Both can be accomplished while maintaining good electrical properties.

A particular advantage of the invention is the ability to use readily available materials and equipment without further treatment or modifications. The present invention is simpler than some of the methods and processes of the prior art which require special reagents and equipment to obtain good conductivity with carbon black, i.e., U.S. Pat. No. 4,097,656. All materials and equipment satisfactory for the practice of the present invention can be readily obtained or would be normally available in a sheet or film manufacturing facility.

From a processing viewpoint, the use of lower amounts of carbon black avoids viscosity problems such as when 5% of more carbon black was required. Even though viscosity reducers such as titanates were known, the present invention eliminates this need if so desired.

The process of the present invention can be envisioned as filtration of carbon black out of a liquid by a porous resin "filter". The resin particles or "filter" remove carbon black from the liquid as it penetrates the resin particle to produce the "dry" blend thus forming as a thin black conductive shell around each particle. Then when the particles are layered and sintered, the surfaces become fused, and a conductive chain structure is produced where current flows along the outer surfaces of the connecting particles. In a fusion process, the thickness of a dry blend lay-up can condense about one third. But, surprisingly, the conductance improves even more for the fused material, thus reducing even further the amount of carbon black required.

The present invention provides industrial applicability for sheets and films useful for static free work environments and for consumer goods with similar antistatic protection.

In the following examples, surface resistivity measurements were conducted according to ASTM D-257 using an Electrotech Systems Inc. Resistivity Probe - Model 802 - "IKE PROBE". An 11-lb. weight applied force to the probe for all measurements. A Dr. Theidig Milli-To wide range resitance meter gas connected to the probe for direct digital readout of resistance. The tests conducted at 50% RH were set up in a room controlled at 50±1% RH and 23°±1° C. temperature. The tests conducted at 15% RH were set up in a dry box controlled at 14±2% RH and 23°±1° C. temperature.

The following examples illustrate the practice of the invention without limiting it to specific embodiments. Example 1 represents the best mode.

EXAMPLE 1

The following ingredients were used in the indicated proportions to prepare about 50 "black" dry blends.

| No. | Material | Parts by Weight |
| --- | --- | --- |
| 1 | PVC Resin (Porous Grade) | 100 |
| 2 | DOP (Di-2-ethlhexyl phthalate) | (30–60) |
| 3 | Butylbenzyl phthalate S-148 | 10 |
| 4 | ESO (Epoxidized Soybean Oil) | 5 |
| 5 | Polyethylene Glycol PE 200 | 1 |
| 6 | Organotin Stabilizer M-275 | 2 |
| 7 | Titanium Dioxide Pigment | 2 |
| 8 | Isopropyl Triisostearoyl Titanate KR55 | (0.10–0.16) |
| 9 | Carbon Black Powder | (.6–4.8) |

The carbon powder (9) Conductex ®- 975 from Columbian Chemicals was supplied in large agglomerated form to minimize dusting. To begin forming the dry blend, the solids (1, 7) were first charged to a Henschel mixer. The liquids (2, 8, 4, 5, 6, 8) were combined with the carbon black (9) to prepare a liquid premix. Starting at low speed, one half of the liquid premix was slowly added to the solids in the mixer. The mixer was then turned to high speed until the temperature reached 130° F. (or until the dry blend looked "dry"). The speed dial was then turned back to low and the rest of the liquid premix was slowly added. The speed dial was then turned to high again. When the temperature reached 150°–160° F., the operation was stopped. The hot-dry blend was collected and allowed to cool, as a black particulate composition.

Each dry blend was passed through a 30 mesh standard sieve screen to remove any large pieces. Then using a piece of 8"×12" Warren release paper, a thin (0.001"–0.002") vinyl plastisol smear coat was applied to the surface using a No. 30 wire wound rod. The sieved dry blend was applied uniformly thick over the smear coat using a 0.110" draw-down bar. The dry blend was then sintered in a hot-air oven at 350° F. for three minutes. Under these conditions, a well-sintered dry blend formed a well knit porous structure from which material did not flake off easily. At higher carbon loadings, it was necessary to add more plasticizer to the dry blend mix to prevent the sintered dry blend from flaking easily.

A white printing ink with the formulation shown below was applied over the surface of the dry blend to fill in the porosity.

| Ingredient | Parts |
| --- | --- |
| PVC Resin | 100 |
| Isobutyrate | 11 |
| DOP (Di-2-ethylhexyl phthalate) | 28 |
| ESO (Epoxidized Soybean Oil) | 5 |
| Organotin Stabilizer | 2 |
| Titanium Dioxide (50% in DOP) | 3 |

The ink was applied with a No. 30 wire wound rod. After coating, the dry blend was fused in a Mathis hot-air oven at 425° F. for three minutes.

Table 1 shows the effect of increasing conductivity with increased loading of carbon black.

TABLE 1

Surface Resistivity as a Function of Carbon Level in the Dry Blend

| Carbon Level (Wt. %) | Surface Resistivity (Ohm/Sq) |
| --- | --- |
| Invention 4.8 | $5 \times 10^3$ |
| Invention 2.8 | $6 \times 10^4$ |
| Invention 1.2 | $5 \times 10^5$ |
| Invention 0.6 | $3 \times 10^9$ |
| Prior Art 20.0 | $1 \times 10^5$ |

It is indeed significant to note that with these very low amounts of carbon black it has been possible to obtain resistivity values which required almost twenty times the amount of carbon black with prior art techniques.

EXAMPLE 2

Compositions were prepared as in Example 1 except that the carbon black level was increased to 8% by weight. Surface resistivities below $10^2$ ohm/sq. were obtained.

EXAMPLE 3

Dry blend was prepared containing 1.2% carbon black as in Example 1. A thin vinyl smear coat was applied to a piece of 8"×12" Warren release paper. The conductive "black" dry blend containing 1.2% carbon black was sprinkled over the surface of the smear coat. A thin layer of particles stuck to the smear coat and the excess particles were removed by inverting the release paper. The surface was smoothed with a thin roller and then the system was fused at 425° F. for three minutes. The result was a 0.005–0.007" black film having a surface resistivity of $2 \times 10^4$ ohm/sq. suitable for conductive packaging.

EXAMPLE 4

A dry blend was prepared as in Example 1 except that carbon black and titanium dioxide were both added into the liquid premix as commercially available dispersions. The dry blend contained:

| Ingredient | Parts |
| --- | --- |
| PVC Resin | 100 |
| DOP | 35 |
| S-148 | 10 |
| ESO | 5 |
| PE-200 | 1 |
| M-275 | 2 |
| KR-55 | .16 |
| TiO2 paste (1:1 w DOP) | 10 |
| Carbon Black | 2 |

After applying the overcoat of Example 1 and fusing the film, the overall appearance was a blue-gray and not black and gave a surface resistivity of $1 \times 10^6$ ohm/sq.

EXAMPLE 5

Conductive sheets were prepared as in Example 1 in which the "black" dry blend was diluted with 60% non-conductivity "white" dry blend in which the carbon black level was reduced to 0.36% of the total sheet weight while providing a surface resistivity of $10^7$–$10^8$ ohm/sq. In comparison, sheets with 10 to 30% nonconductivity particles provided a surface resistivity of $10^5$–$10^6$ ohm/sq. Table 2 shows comparative results.

TABLE 2

Surface Resistivity as a Function of the Amount of Added "White" Dry Blend

| Percent "Black" | Percent "White" | Surface Resistivity (Ohm/Sq) |
|---|---|---|
| 100 | 0 | 6–7 × $10^5$ |
| 90 | 10 | 7 × $10^5$ |
| 80 | 20 | 1 × $10^6$ |
| 70 | 30 | 2–3 × $10^6$ |
| 60 | 40 | 2 × $10^6$ |
| 50 | 50 | 2 × $10^7$ |
| 40 | 60 | 8 × $10^7$ |
| 30 | 70 | 1 × $10^{11}$ |

Tensile properties of Conductive Sheet Goods

| Sample No. | DOP (Phr) | % "White" | % "Black" | Tensile Strength (psi) | Elongation (per cent) |
|---|---|---|---|---|---|
| 1 | 30 | 0 (Control) | 0 | 2147 | 289 |
| 2 | 30 | 100 | 0 | 2113 | 284 |
| 3 | 35 | 100 | 0 | 2018 | 318 |
| 4 | 40 | 100 | 0 | 1875 | 302 |
| 5 | 30 | 90 | 10 | 2156 | 286 |
| 6 | 30 | 80 | 20 | 2206 | 278 |
| 7 | 30 | 70 | 30 | 2154 | 288 |

Not only did the wide range of test samples provide exceptional physical and static dissipative properties, but a wide range of attractive grey and salt and pepper effects were observed with the minimal amounts of carbon utilized.

EXAMPLE 6

Conductive foam compositions were prepared in "black" and "grey" modifications according to the following:

| Ingredients | Black Foam | White Foam |
|---|---|---|
| PVC Resin | 100 | 100 |
| DOP | 30 | 17 |
| DOA (dioctyl adipate) | — | 10 |
| S-148 | 10 | 10 |
| ESO | 5 | 5 |
| PE-200 | 1 | 1 |
| Diazo blowing agent | 4.4 | 4.4 |
| Ba Neodecanote | 1.25 | 1.25 |
| Ca, Zn Soap stabilizer | 2.75 | 2.75 |
| Markstate AL-15 | — | 6 |
| TiO2 Paste (1:1 w DOP) | — | 6 |
| Conductex ® 975 | 2 | — |

To make the grey foam, 70 parts of the black foam was mixed with 30 parts of the white foam, putting the blowing agent in the white blend helped create the grey look in the overall composition. The final composition had a surface resistivity of $2.3 \times 10^6$ ohm/sq.

EXAMPLE 7

A white composition was prepared similar to Example 1 except using white conductive particles of titanium dioxide coated with antimony doped tin oxide available from Mitsubishi Metal Corporation and identified as W-1. The formulation was:

| PVC Resin | 100 |
|---|---|
| DOP | 40 |
| S-148 | 10 |
| ESO | 5 |
| PE-200 | 1 |
| M-275 | 2 |
| KR-55 | .16 |
| W-1 | 20 |

The composition was prepared and tested as in Example 1. After sintering, the composition gave a surface resistivity of $10^8$, while after fusion the value was $3.0 \times 10^9$ ohm/sq.

I claim:

1. A vinyl composition having reduced electrical surface resistivity, comprising a fused layer of a dry blend of:
    (a) a polyvinyl chloride porous dry blend resin, the said porous dry blend resin containing particles of resin with a conductive shell,
    (b) a plasticizer for the polyvinyl chloride dry blend resin,
    (c) a stabilizer for the polyvinyl chloride dry blend resin,
    (d) conductive particles in an amount of from 0.2 to 20% by weight of the total weight of the composition, wherein the conductive particles form the conductive shell.

2. The composition of claim 1 with a carbon black content of 0.35 to 4.5%.

3. The composition of claim 2 with a surface resistivity below $10^8$ ohm/sq.

4. The composition of claim 3 where (a) is a porous PVC resin.

5. The composition of claim 4 containing an organic metal coupling agent where the metal is titanium or zirconium.

6. The composition of claim 5 where the coupling agent is isopropyl triisostearoyl titanate.

7. The composition of claim 1 with a white conductive particle content of 1 to 10%.

8. The composition of claim 1 wherein the polyvinyl chloride porous dry blend resin is polyvinyl chloride pearls.

9. The composition of claim 1 which further contains titanium dioxide.

10. The composition of claim 1 wherein the fused layer is a film.

11. The composition of claim 10 wherein the film is packaging material wherein the conductive particles are carbon black, and are present in an amount greater than 1.2% by weight.

12. The composition of claim 1 also having, with the porous PVC dry blend resin, white pigmented non-conductive dry blend particles in an amount less than 60% by weight.

* * * * *

UNITED STATES PATENT AND TRADEMARK OFFICE
CERTIFICATE OF CORRECTION

PATENT NO. : 4,976,890

DATED : December 11, 1990

INVENTOR(S) : Richard E. Felter et al

It is certified that error appears in the above-identified patent and that said Letters Patent is hereby corrected as shown below:

In column 1, line 30, patent number should read --4,374,760--; line 37, "Oalahorra" should read --Calahorra--; lines 42, 48 and 59, "PVO" should read --PVC--. In column 2, line 18, "polyurethane" should read --polyethylene--. In column 5, line 35, number "8" (first occurrence) should read --3--.

In the Claims, claim 2 at column 8, should read as follows: --The composition of claim 1 wherein the conductive particles includes carbon black in an amount of from 0.35 to 4.5%.-- Claim 4 at column 8, should read as follows: --The composition of claim 1 where the stabilizer is an organotin stabilizer.-- Claim 5 at column 8, line 1, "claim 4" should read --claim 1 also--. Claim 6 at column 8, line 2, "triisostearoyl" should read --triisostearyl--.

Signed and Sealed this

Sixteenth Day of June, 1992

Attest:

DOUGLAS B. COMER

Attesting Officer     Acting Commissioner of Patents and Trademarks